No. 667,114.  
H. W. BUCK.  
MEANS FOR PREVENTING HUNTING OF DYNAMO ELECTRIC MACHINES.  
(Application filed Apr. 28, 1900.)  
(No Model.)  
Patented Jan. 29, 1901.

Witnesses:  
Lewis P. Abell  
Benjamin B. Hull

Inventor:  
Harold W. Buck,  
by Albert G. Davis  
Atty.

UNITED STATES PATENT OFFICE.

HAROLD W. BUCK, OF SCHENECTADY, NEW YORK, ASSIGNOR TO THE GENERAL ELECTRIC COMPANY, OF NEW YORK.

MEANS FOR PREVENTING HUNTING OF DYNAMO-ELECTRIC MACHINES.

SPECIFICATION forming part of Letters Patent No. 667,114, dated January 29, 1901.

Application filed April 28, 1900. Serial No. 14,647. (No model.)

*To all whom it may concern:*

Be it known that I, HAROLD W. BUCK, a citizen of the United States, residing at Schenectady, county of Schenectady, State of New York, have invented certain new and useful Improvements in Means for Preventing Hunting of Dynamo-Electric Machines, (Case No. 1,327,) of which the following is a specification.

My invention aims to prevent the hunting of synchronously-operated alternating-current dynamo-electric machines, and is particularly useful in those cases in which a machine of this character is connected to alternating-current mains in which a pulsation of frequency occurs. Such a state of facts is represented by a synchronous motor driven from a generator direct-connected to a steam-engine the moving parts of which do not possess sufficient inertia to preserve a uniform angular velocity throughout each revolution. The generator speed therefore fluctuates periodically with that of the driving-engine, thereby producing an alternating current of pulsating frequency. If the synchronous motor driven from this source of supply does not possess sufficient inertia in itself, its revolving member will pulsate in speed in correspondence with the pulsation of the prime mover. I have found that by varying the field excitation of the synchronous motor or other machine within certain limits and in time with the engine-stroke an interference is caused and the pulsation broken up.

My invention will best be understood by reference to the following description of an embodiment of the same, taken in connection with the accompanying drawings, while its scope will be particularly pointed out in the appended claims.

Figure 1:
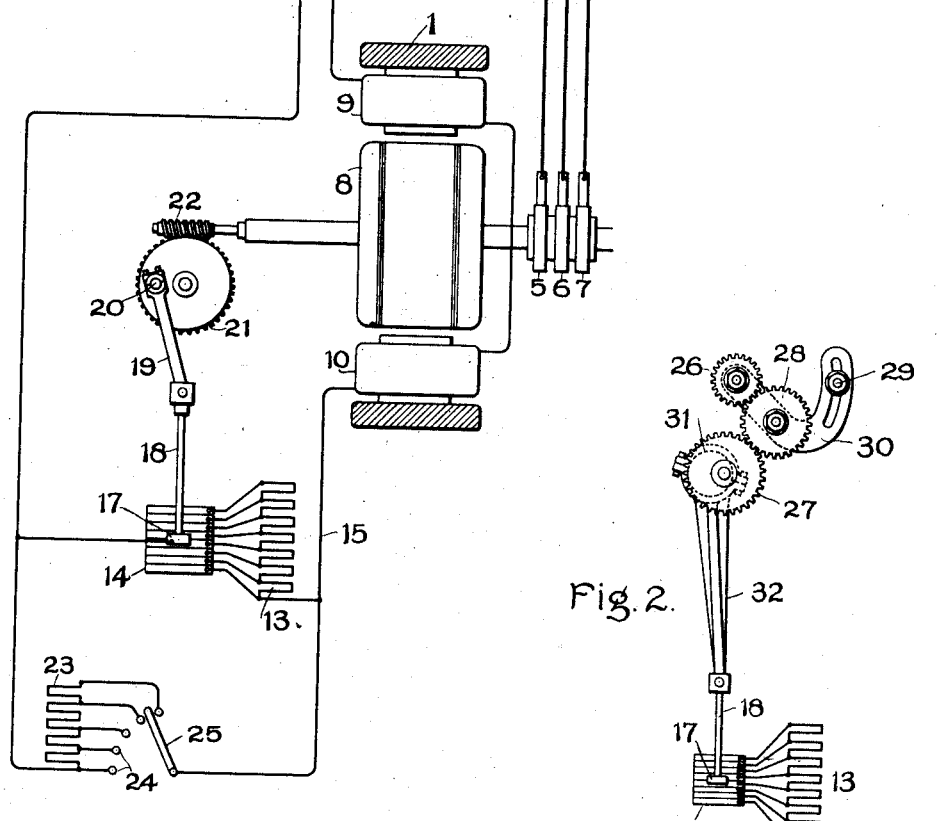
Figure 2:
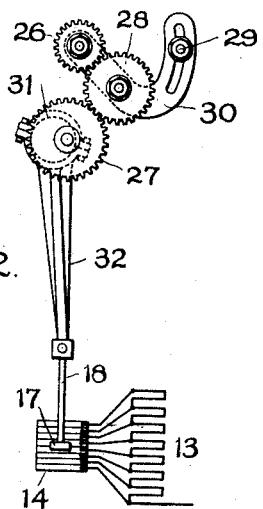

In the drawings, Figure 1 represents an arrangement for carrying out my invention, and Fig. 2 a modification.

In Fig. 1 I have represented a synchronous motor at 1 as typical of any synchronously-operating alternating-current machine to which I may apply my invention. This motor is of any ordinary type and here shown as adapted to the utilization of three-phase alternating currents. These currents are derived from some alternating-current source and are transmitted to the motor in any approved fashion and fed into the same by means of the leads 2 3 4. These leads pass to collector-rings 5 6 7, respectively, which are connected in the usual way to the winding of the armature 8 of the motor. The motor is provided with field-windings in the ordinary manner, two of the field-coils being indicated at 9 10, respectively. These field-windings may be excited by direct current derived from any suitable source, in this case from a direct-current-exciter circuit represented by the leads 11 12.

In order to carry out my invention by periodically-varying the current in the exciting-circuit of the machine, I provide a resistance varying means actuated by mechanical connection with a revolving member of the machine. Many mechanical arrangements could be employed for securing the beneficial effects of my invention. For purposes of illustration I have illustrated in Fig. 1 a suitable apparatus for performing the required functions.

A non-inductive resistance 13 is connected in series with the exciting-circuit of the motor 1, the connections being arranged so that a variable amount of resistance may be inserted in circuit. For this purpose a series of contacts are arranged side by side and connected to points in the length of the resistance 13, respectively. One end of the resistance 13 is connected to one terminal 15 of the exciting-circuit, the other terminal 16 of the field-exciting circuit being connected to the lead 11 of the main exciter-circuit. A connection leads from the other main 12 to a contact 17, movable over the fixed contact 14. This movable contact 17 is actuated by means of suitable mechanical connections with the rotating member of the motor 1, these connections in the instance shown consisting of a reciprocating rod 18, movable in suitable bearings (not shown) and actuated through a connecting-rod 19, engaging with a crank-pin 20, carried by a worm-wheel 21, which in its turn is driven by means of a worm 22 from the shaft of the motor. As the armature of the motor rotates the movable contact 17 is pushed back and forth over the fixed contacts, thereby periodically varying the resistance in the field-exciting circuit of the motor. In order to adjust the limits of variation of this resistance, I find it convenient to connect a variable resistance between the terminal 15 and the movable contact 17. This resistance is indicated at 23 and for purposes of adjustment is provided with a series of fixed contacts 24, connected to said resistance at intervals. A switch-arm 25 is adapted to be moved over the fixed contacts 24, thereby cutting in and out the resistance 23.

Fig. 2 illustrates an arrangement of change-gearing whereby any desired adjustment may be secured, so as to fit the machine to run on circuits having various periods of pulsation in their frequency. A small spur-wheel 26 is driven synchronously with the motor-armature and is geared to another spur-wheel 27 through the instrumentality of an adjustable idler 28. The idler 28 is mounted so that its center is movable in an arc of a circle about the center of the wheel 26 and may be clamped in position by means of a bolt 29, fastened through a slotted carrier 30, (indicated partly in dotted lines, partly in full lines.) The wheel 27 may be replaced by wheels having any desired number of teeth, whereby the speed of rotation of the axis of the wheel 7 may be widely varied with respect to speed of rotation of a wheel 26. The wheel 27 may be carried by a shaft provided with an eccentric (indicated in dotted lines at 31) and connected in the usual manner to an eccentric-rod 32, which is shown as operating the fixed contact 17, corresponding to the fixed contact 17 in Fig. 1.

As the field of the motor is strengthened and weakened by periodically varying the resistance in its exciting-circuit, the revolving part of the synchronous motor is accelerated or retarded accordingly. If the variation in field strength is arranged so that it accelerates the revolving part at the instant that the driving-engine slows up, and thereby retards it, the oscillation is broken up. The driving-gearing for the resistance-varying means illustrated in the drawings should be chosen so as to cause a pulsation in the field strength of a motor in time with the pulsation of frequency in the alternating current, and since the speed of the synchronous motor bears a fixed relation to that of the prime mover this may usually be accomplished without difficulty.

Although I have described my invention in connection with a synchronous alternating-current motor, I have done so merely by way of illustration, so that I do not wish my invention to be limited to use in this connection only, since it is manifestly useful in many other relations—as, for example, in connection with rotary converters or the like.

What I claim as new, and desire to secure by Letters Patent of the United States, is—

1. The combination of an alternating-current dynamo-electric machine excited by direct current, and means for periodically varying the field excitation.

2. The combination of an alternating-current dynamo-electric machine and means for varying the resistance of the field-circuit periodically.

3. The combination of an alternating-current dynamo-electric machine and means dependent upon the speed of the machine for periodically accelerating and retarding its moving member.

4. The combination of a circuit carrying an alternating current of irregular frequency, a synchronous alternating-current machine electrically connected therewith, and means for varying the torque of said machine in time with the variation of frequency of current in said circuit.

5. The combination of a circuit carrying an alternating current of pulsating frequency, a synchronous alternating-current machine connected therewith and means for varying the exciting-current of said machine in time with the pulsations of frequency.

6. The combination of a circuit carrying an alternating current of regularly-pulsating frequency, a synchronous alternating-current machine connected therewith and current-varying means acting synchronously with the pulsating frequency for preserving a uniform angular velocity of said machine.

In witness whereof I have hereunto set my hand this 24th day of April, 1900.

HAROLD W. BUCK.

Witnesses:
BENJAMIN B. HULL,
ALEX F. MACDONALD.